United States Patent
Dinh et al.

(10) Patent No.: US 11,216,911 B2
(45) Date of Patent: Jan. 4, 2022

(54) DEVICE MANUFACTURING CYCLE TIME REDUCTION USING MACHINE LEARNING TECHNIQUES

(71) Applicant: Dell Products L.P., Round Rock, TX (US)

(72) Inventors: Hung T. Dinh, Austin, TX (US); Rajesh Krishnan, Bangalore (IN); Vijaya P. Sekhar, Bangalore (IN); Sabu K. Syed, Austin, TX (US); Geetha Venkatesan, Bangalore (IN); Sethukarasi Sockalingam, Bangalore (IN); Pradeepta Ranjan Choudhury, Bengaluru (IN); Abhijit Mishra, Bangalore (IN); Kannappan Ramu, Frisco, TX (US); Jatin Kamlesh Thakkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 16/669,667

(22) Filed: Oct. 31, 2019

(65) Prior Publication Data

US 2021/0133930 A1    May 6, 2021

(51) Int. Cl.
*G06T 5/00* (2006.01)
*G06N 3/08* (2006.01)
*G06K 9/00* (2006.01)
*G06T 7/13* (2017.01)

(52) U.S. Cl.
CPC .......... *G06T 5/002* (2013.01); *G06K 9/00744* (2013.01); *G06K 9/00765* (2013.01); *G06N 3/08* (2013.01); *G06T 7/13* (2017.01)

(58) Field of Classification Search
None
See application file for complete search history.

(56) References Cited

U.S. PATENT DOCUMENTS

| 10,579,875 B2 * | 3/2020 | Dal Mutto | G06K 9/00201 |
| 10,607,182 B2 * | 3/2020 | Shah | G06K 9/00771 |
| 2012/0317265 A1 * | 12/2012 | Das | H05K 7/1498 709/224 |

(Continued)

OTHER PUBLICATIONS

Tonioni, Alessio, Eugenio Serra, and Luigi Di Stefano. "A deep learning pipeline for product recognition on store shelves." 2018 IEEE International Conference on Image Processing, Applications and Systems (IPAS). IEEE, 2018. (Year: 2018).*

*Primary Examiner* — Andrae S Allison
(74) *Attorney, Agent, or Firm* — Ryan, Mason & Lewis, LLP (57) ABSTRACT

Methods, apparatus, and processor-readable storage media for device manufacturing cycle time reduction using machine learning techniques are provided herein. An example computer-implemented method includes obtaining video input related to one or more manufacturing resources in a manufacturing environment; determining availability status information for at least one of the one or more manufacturing resources by applying one or more machine learning models to the obtained video input; and outputting the determined availability status information to at least one user device associated with the manufacturing environment.

20 Claims, 7 Drawing Sheets

(56) References Cited

U.S. PATENT DOCUMENTS

| | | | |
|---|---|---|---|
| 2015/0206290 A1* | 7/2015 | Ryu | G06T 5/003 |
| | | | 382/255 |
| 2015/0213837 A1* | 7/2015 | Yamaji | G11B 27/034 |
| | | | 386/278 |
| 2016/0188993 A1* | 6/2016 | Beato | G06K 9/4652 |
| | | | 382/163 |
| 2016/0221190 A1* | 8/2016 | Aloimonos | B25J 9/1661 |
| 2019/0108396 A1* | 4/2019 | Dal Mutto | G06T 7/174 |
| 2019/0114532 A1* | 4/2019 | Sunwoo | G06T 5/00 |
| 2019/0138850 A1* | 5/2019 | Sigal | G06K 9/481 |
| 2019/0156276 A1* | 5/2019 | Fisher | G06Q 10/087 |
| 2019/0171911 A1* | 6/2019 | Greenberg | G06N 3/084 |
| 2019/0244008 A1* | 8/2019 | Rivera | G06K 9/00671 |
| 2019/0251192 A1 | 8/2019 | Govindaraj et al. | |
| 2019/0266747 A1 | 8/2019 | Zhou et al. | |
| 2020/0095001 A1* | 3/2020 | Menon | B65B 5/12 |
| 2020/0269429 A1* | 8/2020 | Chavez | B25J 11/0045 |

* cited by examiner

```
def video_to_frame_samples () :
    '''
    convert video to frames and randomly select samples for tagging
    '''
    dir_input = input("Provide path where video resides:")
    dir_input = os.path.abspath(dir_input)
    os.chdir(dir_input)
    vid_input = input("Name of video to process into frames (with extension): ")
    vidcap = cv2.VideoCapture (vid_input)
    success, image = vidcap.read()
    count = 0
    while success:
        cv2.imwrite ("frame%d.jpg" % count, image)    # save frame as JPEG file
        success, image = vidcap.read ()
        #print('Read a new frame: ', success)
        count += 1
    files = [f for f in os.listdir(dir_input) if os.path.isfile(f) ]

random_input = float(input("Provide percentage of samples to tag (in decimals): "))
    # select defined perc of the files randomly
    random_files = np.random.choice(files, int(len(files) *random_input))

os.mkdir('samples_for_tagging')

images=glob.glob("*.JPG")
    images
    for image in random_files:
        img = Image.open(image)
        img.save("samples_for_tagging\\"+image)
    print(dir_input+"\\samples_for_tagging")
```

FIG. 3

```
def image_area_of_interest () :
    """
    folder_path: os path to where all images are stored
    """
    # path to all images
    dir_input = input ("Provide path where all images reside:")
    dir_input = os.path.abspath(dir_input)
    os.chdir(dir_input)

#select random image to show (to assist user at defining cropping parameters)
    random_filename = random.choice([
        x for x in os.listdir (dir_input)
        if os.path.isfile(os.path.join(dir_input, x))
    ])
    image = Image.open(dir_input + "/" + str(random_filename))
    image.show()
    #gather inputs(left, upper, right, lower)
    left_input = float(input("Percentage(in decimals) crop from left? "))
    left = round(left_input * 256, 0)
    upper_input = float(input("Percentage(in decimals) crop from top? "))
    upper = round(upper_input * 256, 0)
    right_input = float(input("Percentage(in decimals) crop from right? "))
    right = round((1 - right_input) * 256, 0)
    bottom_input = float(input("Percentage(in decimals) crop from bottom? "))
    bottom = round((1 - bottom_input) * 256, 0)
    #make new directory to store cropped images
    os.mkdir('cropped")
    #crop images in loop
        images=glob.glob("*.JPG")
    images
    for image in images:
        img = Image.open(image)
        #Resizing image
        img1 = img.resize([256, 256])
        img2 = img1.crop((left, upper, right, bottom))
        img2.save("cropped\\"+image)
    dir_output = dir_input + "\cropped"
    dir_output = os.path.abspath(dir_output)
    return dir_output
```

```
#to get coordinates of individual racks using canny edge detection,
# contour finding and removing outer most contour then return the coordinates
def getCoordinateOfMask () :
    getCategories ()
    contours, hierarchy = cv2.findContours (masked_image, cv2.RETR_EXTERNAL, cv2.CHAIN_APPROX_SIMPLE)
    boundingBoxes = [cv2.boundingRect (c) for c in contours]
    index = findLargest(boundingBoxes)
    print(boundingBoxes[index])
    x, y, w, h = boundingBoxes[index]
    cv2.rectangle(masked_image_temp, (x, y) (x+w, y+h), (255, 255, 255), 2)
    cv2.imshow('image', masked_image_temp)
    cv2.waitKey(0)
    cv2.destroyAllWindows
    return boundingBoxes[index]
# to find the largest contour.
# to remove the outer most contour. (the contour representing the entire shelf.
def findLargest (boundingBoxes) :
    area_1 = boundingBoxes [0] [2] *boundingBoxes [0] [3]
    index = 0
    for i in range(1, len(boundingBoxes)) :
        if area_1 < boundingBoxes[i] [2] *boundingBoxes[i] [3] and boundingBoxes[i] [2] *boundingBoxes[i] [1] != 0 :
            # print (boundingBoxes[i])
            area_1 = boundingBoxes [i] [2] *boundingBoxes [i] [3]
            index = i
    return index
```

FIG. 5

```
#to iterate over the total number of racks and store the reults of
# all rack coordinates in a list boundingBoxesList
def  getAllCords () :
        global N
        global rack_position_find
        boundingBoxesList = {}
        for i in range(1, N+1) :
                rack_position_find = i
                b = getCoordinateOfMask ()
                boundingBoxesList[i] = b
```

FIG. 6

```
# Tested CNN model stack
model = Sequential ()
model.add(Conv2D(64, (3, 3), input_shape = X.shape[1:]))
model.add(Activation("relu"))
model.add(MaxPooling2D(pool_size = (2, 2)))

model.add(Conv2D(64, (3, 3)))
model.add(Activation("relu"))
model.add(MaxPooling2D(pool_size = (2, 2)))

model.add(Flatten())
model.add(Dense(64))
model.add(Activation("relu"))

model.add(Dense(1))
model.add(Activation('sigmoid'))

model.compile(loss = "binary_crossentropy",
optimizer = "adam",
metrics = ['accuracy'])
```

FIG. 9

DEVICE MANUFACTURING CYCLE TIME REDUCTION USING MACHINE LEARNING TECHNIQUES

FIELD

The field relates generally to information processing systems, and more particularly to techniques for processing resource information in such systems.

BACKGROUND

Commonly, the manufacturing process for computing devices such as laptop and/or desktop computers includes stacking manufactured items after a building stage, organizing the stacked items for software installations, and de-stacking the items for testing and packaging. However, conventional manufacturing management approaches face challenges including, for example, efficiently identifying empty shelf space for stacking manufactured items. Such challenges result in delays in the overall manufacturing cycle time, inefficient use of human labor, and non-optimal usage of manufacturing resources.

SUMMARY

Illustrative embodiments of the disclosure provide techniques for device manufacturing cycle time reduction using machine learning techniques. An exemplary computer-implemented method includes obtaining video input related to one or more manufacturing resources in a manufacturing environment, determining availability status information for at least one of the one or more manufacturing resources by applying one or more machine learning models to the obtained video input, and outputting the determined availability status information to at least one user device associated with the manufacturing environment.

Illustrative embodiments can provide significant advantages relative to conventional manufacturing management approaches. For example, challenges associated with delays in manufacturing cycle time, inefficient use of human labor, and non-optimal usage of manufacturing resources are overcome in one or more embodiments through determining manufacturing resource availability in real-time using machine learning models and other machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing system and associated processing platforms, and other types of processing devices. It is to be appreciated, however, that the invention is not restricted to use with the particular illustrative information processing system and device configurations shown. Accordingly, the term "information processing system" as used herein is intended to be broadly construed, so as to encompass, for example, any system comprising multiple networked processing devices.

Figure 1:
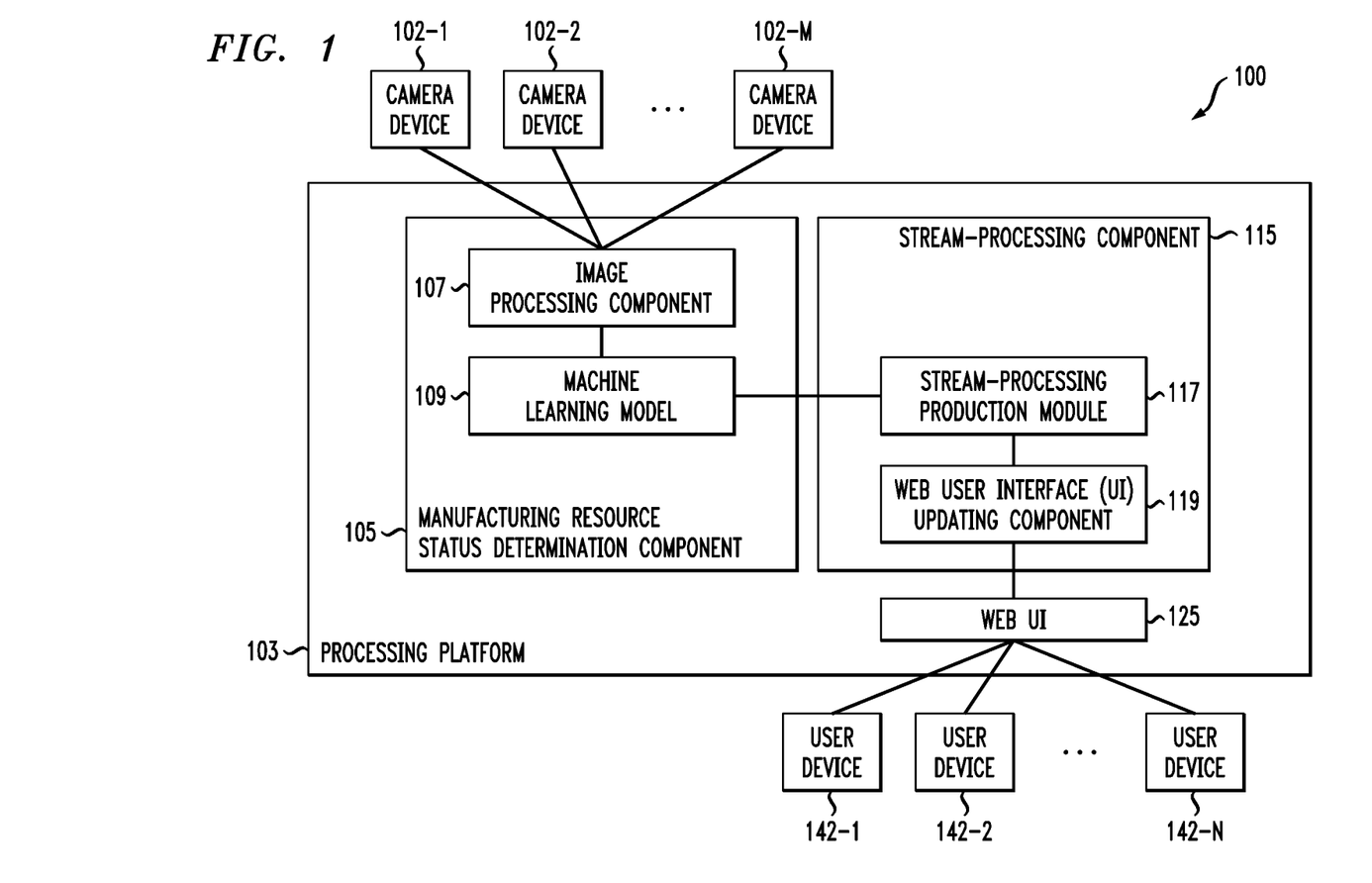
FIG. 1 shows an information processing system configured for device manufacturing cycle time reduction using machine learning techniques in an illustrative embodiment.

FIG. 1 shows an information processing system 100 (which can, for example, be associated with at least one manufacturing environment) configured in accordance with an illustrative embodiment. The information processing system 100 comprises a plurality of camera devices 102-1, 102-2, . . . 102-M, collectively referred to herein as camera devices 102, and a plurality of user devices 142-1, 142-2, . . . 142-N, collectively referred to herein as user devices 142. The camera devices 102 and user devices 142 are coupled to a network, where the network in this embodiment is assumed to represent a sub-network or other related portion of the information processing system 100. Also coupled to such a network is processing platform 103.

The user devices 142 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 142 in some embodiments comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The above-noted network is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a Wi-Fi or WiMAX network, or various portions or combinations of these and other types of networks. The information processing system 100 in some embodiments therefore comprises combinations of multiple different types of networks, each comprising processing devices configured to communicate using internet protocol (IP) or other related communication protocols.

Additionally, the processing platform 103 can have an associated database configured to store data pertaining to manufacturing resources. A database in such an embodiment can be implemented using one or more storage systems associated with the processing platform 103. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the processing platform 103, in one or more embodiments, are input-output devices, which illustratively comprise keyboards, displays or other types of input-output devices in any combination. Such input-output devices can be used, for example, to support one or more user interfaces to the processing platform 103, as well as to support communication between the processing 103 and other related systems and devices not explicitly shown.

Additionally, the processing platform 103 in the FIG. 1 embodiment is assumed to be implemented using at least one processing device. Each such processing device generally comprises at least one processor and an associated memory, and implements one or more functional modules for controlling certain features of the processing platform 103.

More particularly, the processing platform 103 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the processing platform 103 to communicate over the network with the camera devices 102 and the user devices 142, and illustratively comprises one or more conventional transceivers.

As also depicted in FIG. 1, the processing platform 103 further comprises a manufacturing resource status determination component 105, a stream-processing component 115, and a web user interface (UI) 125. As illustrated, the manufacturing resource status determination component 105 includes an image processing component 107 and a machine learning model 109, while the stream-processing component 115 includes a stream-processing production module 117 and a web UI updating component 119. In at least one embodiment, video and/or image input from the camera devices 102 is obtained by and/or provided to the image processing component 107, which processes the input in conjunction with the machine learning model 109 (as further detailed herein). The resulting output generated by the machine learning model 109 is provided to the stream-processing production module 117 of stream-processing component 115. As further described herein, the stream-processing production module 117 processes the machine learning model output, and based at least in part on that processing, provides an input to the web UI updating component 119, which uses that input to make one or more updates to the web UI 125. The web UI 125 is then utilized to communicate with one or more of the user devices 142 (for example, via an application installed on the user devices 142).

It is to be appreciated that this particular arrangement of elements 105, 115 and 125 illustrated in the processing platform 103 of the FIG. 1 embodiment is presented by way of example only, and alternative arrangements can be used in other embodiments. For example, the functionality associated with the elements 105, 115 and 125 in other embodiments can be combined into a single module, or separated across a larger number of modules. As another example, multiple distinct processors can be used to implement different ones of the elements 105, 115 and 125 or portions thereof.

Additionally, at least portions of the manufacturing resource status determination component 105 and the stream-processing component 115, for example, may be implemented at least in part in the form of software that is stored in memory and executed by a processor.

It is to be understood that the particular set of elements shown in FIG. 1 for device manufacturing cycle time reduction using machine learning techniques involving information processing system 100 is presented by way of illustrative example only, and in other embodiments additional or alternative elements may be used. Thus, another embodiment includes additional or alternative systems, devices and other network entities, as well as different arrangements of modules and other components.

An exemplary process utilizing manufacturing resource status determination component 105, stream-processing component 115, and web UI 125 of an example processing platform 103 in information processing system 100 will be described in more detail with reference to the flow diagram of FIG. 7.

As such, at least one embodiment of the invention includes determining the status of rack shelves (that is, whether the rack shelves are empty, full, or partially full) through image analysis using machine learning techniques (e.g., one or more deep learning algorithms). Additionally, such an embodiment includes outputting the status determination via, for example, displaying the rack availability information on one or more user devices (e.g., mobile devices) associated with one or more users within a manufacturing facility. Accordingly, one or more embodiments include empty rack detection using artificial intelligence (AI) and/or machine learning techniques.

By way of illustration, and as further detailed below, FIG. 2 through FIG. 6 provide example pseudocode for carrying out multiple functions of processing platform 103.

Figure 2:
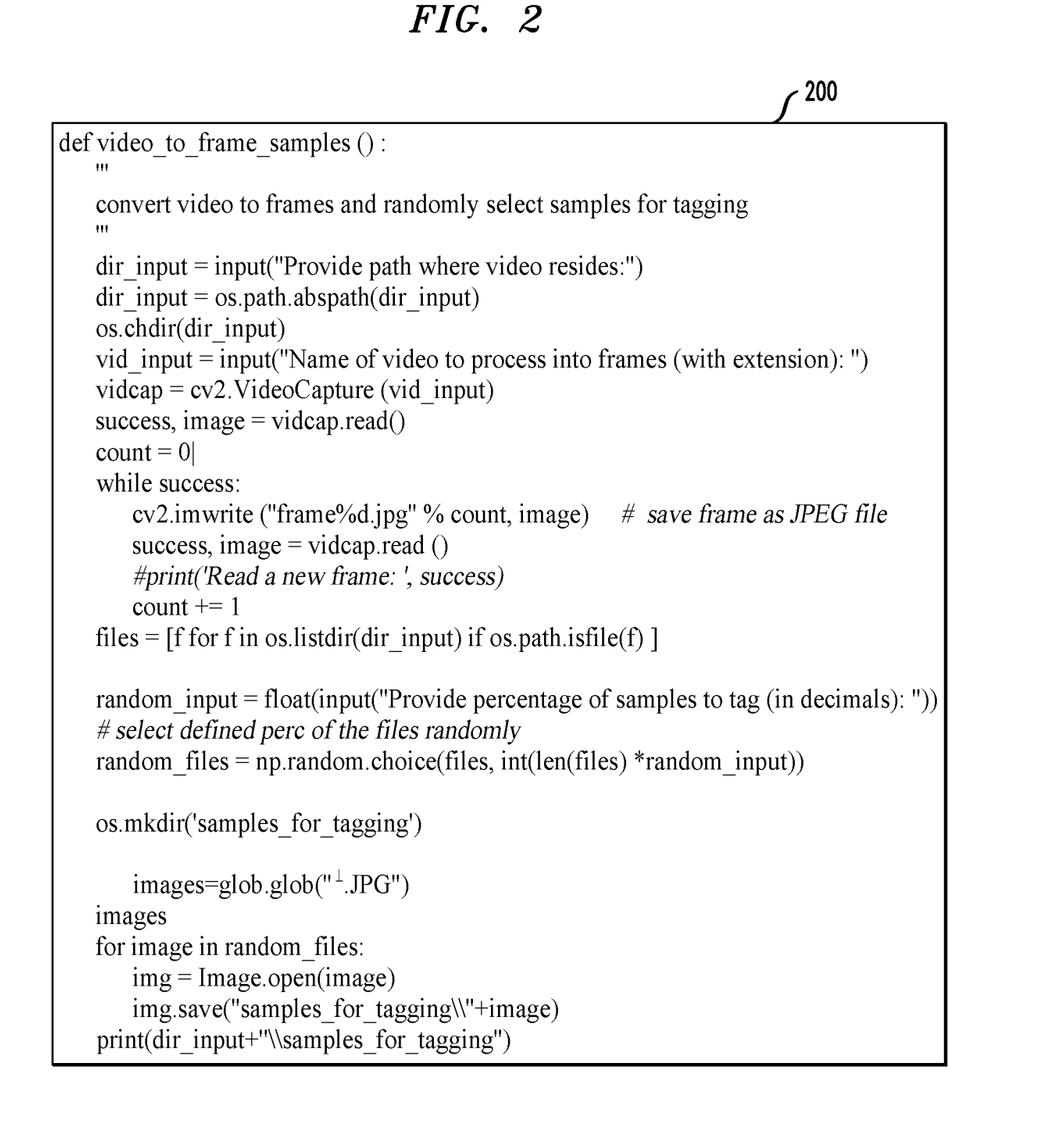
FIG. 2 shows example pseudocode for converting video inputs to image frames in an illustrative embodiment.

FIG. 2 shows example pseudocode for converting video inputs to image frames in an illustrative embodiment. In such an embodiment, pseudocode 200 is executed by or under the control of a processing platform, such as processing platform 103, or another type of processing platform. For example, the pseudocode 200 may be viewed as comprising a portion of a software implementation of at least part of manufacturing resource status determination component 105 of the FIG. 1 embodiment.

The pseudocode 200 illustrates example steps for converting video inputs to frames. Specifically, for training purposes, a model can require a video of a shelf for a certain amount of time (depending, for example, on the frequency of filling of racks). The model would take the frequency as input, convert the video frames to images, and store the images in a directory. A user can then be prompted for the images to be labelled, and the resulting labelled images can be stored in a folder system. It is to be appreciated that this particular pseudocode shows just one example implementation of a process for converting video inputs to frames, and alternative implementations of the process can be used in other embodiments.

Figure 3:
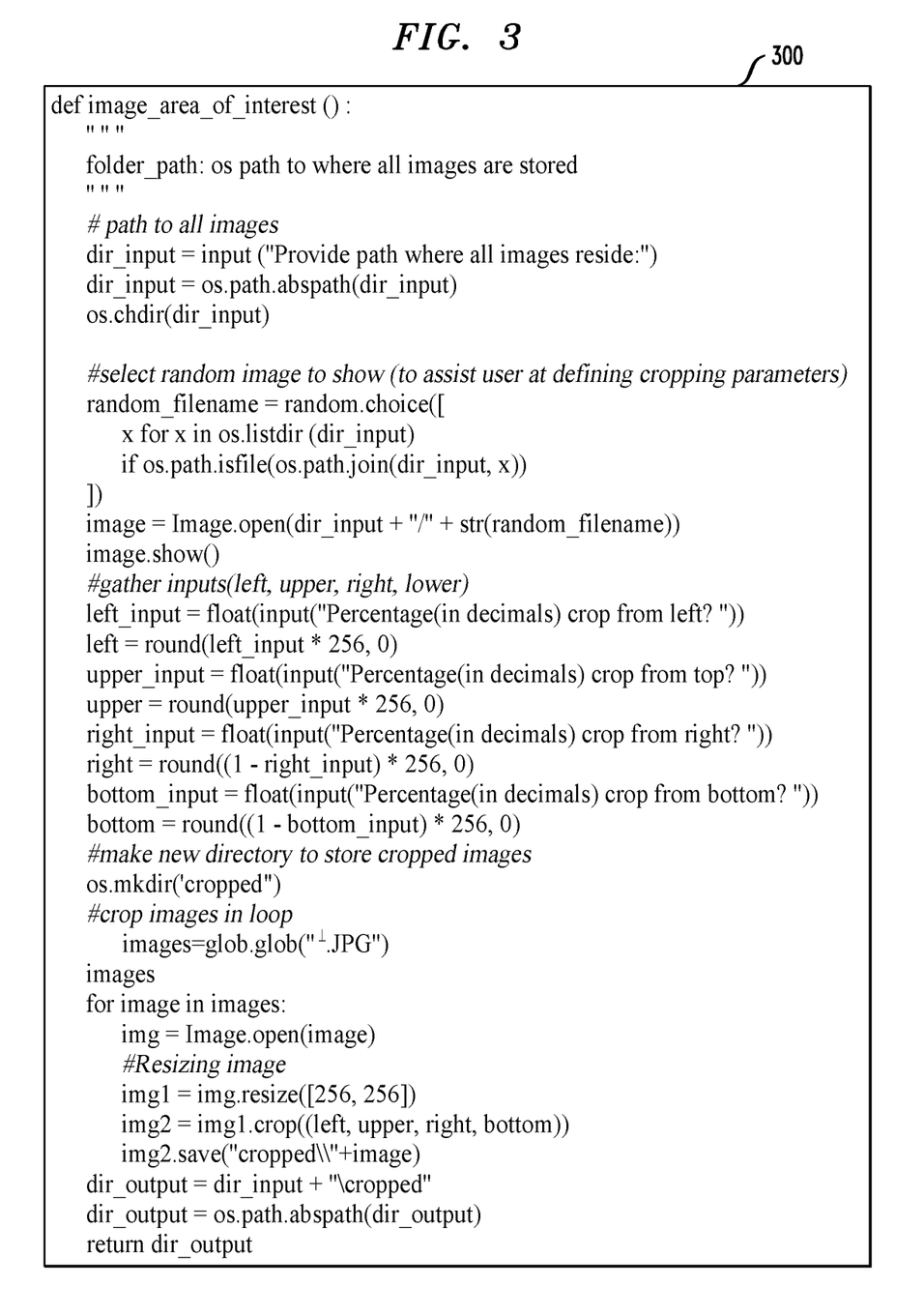
FIG. 3 shows example pseudocode for identifying areas of interest in image frames in an illustrative embodiment.

FIG. 3 shows example pseudocode for identifying areas of interest in image frames in an illustrative embodiment. In such an embodiment, pseudocode 300 is executed by or under the control of a processing platform, such as processing platform 103, or another type of processing platform. For example, the pseudocode 300 may be viewed as comprising a portion of a software implementation of at least part of manufacturing resource status determination component 105 of the FIG. 1 embodiment.

The pseudocode 300 illustrates example steps for identifying areas of interest in image frames. Specifically, the images obtained from the video input will contain one or more racks/shelves along with portions of the surrounding/background environment. As shown in the example pseudocode 300, a shelf is extracted from the background environment via a configurable step wherein the user has an option of cropping the shelf using a graphical user interface (GUI) or implementing a model to extract the shelf using a median filter applied to the image(s) followed by application of a canny edge detection technique, and subsequently identifying and/or determining contour information to obtain/extract the shelf. It is to be appreciated that this particular pseudocode shows just one example implementation of a process for identifying areas of interest in image frames, and alternative implementations of the process can be used in other embodiments.

Figure 4:
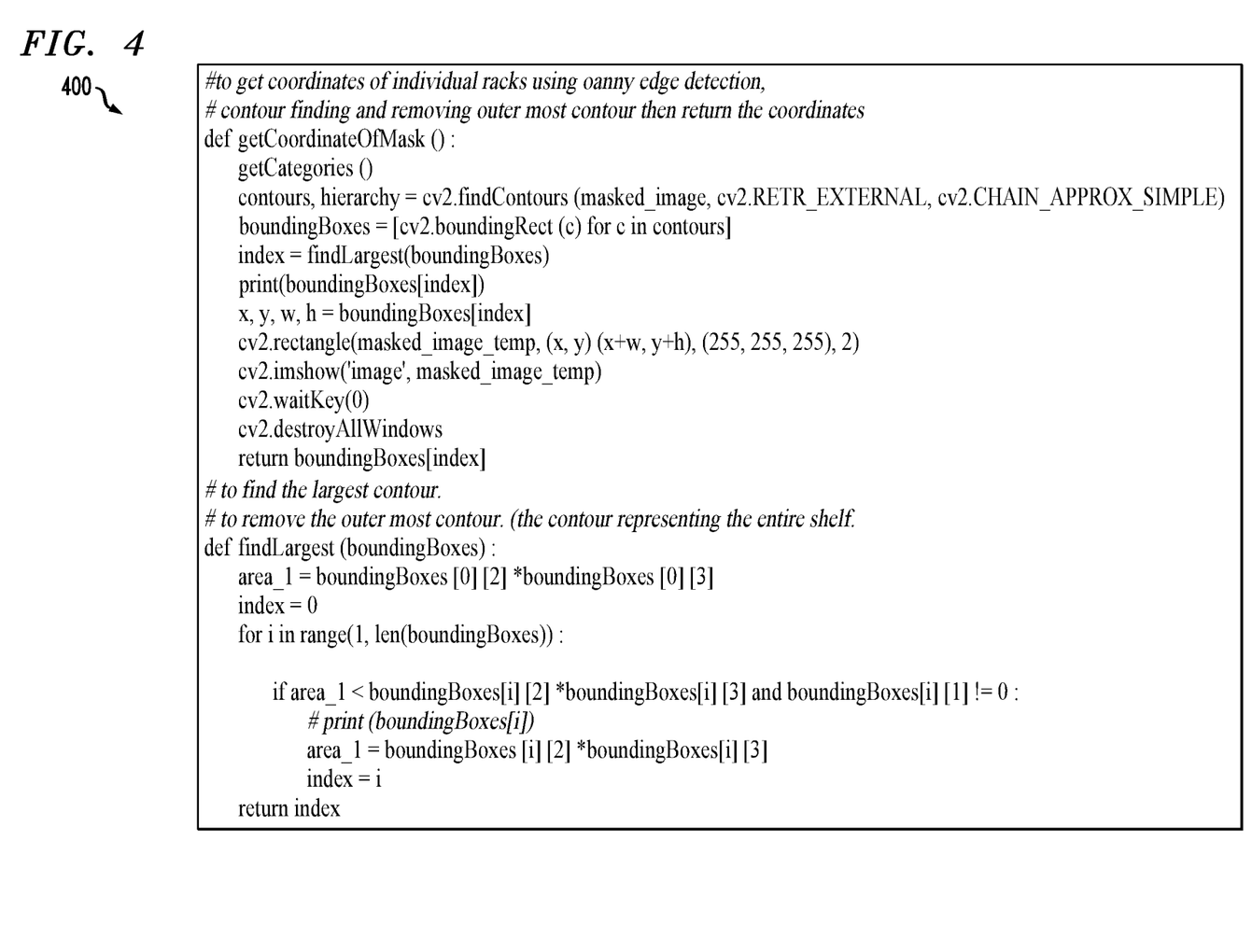
FIG. 4 shows example pseudocode for determining coordinates of manufacturing resources in an illustrative embodiment.

FIG. 4 shows example pseudocode for determining coordinates of manufacturing resources (for example, racks and/or shelves) in an illustrative embodiment. In such an embodiment, pseudocode 400 is executed by or under the control of a processing platform, such as processing platform 103, or another type of processing platform. For example, the pseudocode 400 may be viewed as comprising a portion of a software implementation of at least part of manufacturing resource status determination component 105 of the FIG. 1 embodiment.

The pseudocode 400 illustrates example steps for identifying coordinates of each extracted rack/shelf. Specifically, after extracting the rack/shelf from the surrounding environment (as detailed above in connection with FIG. 3), at least one embodiment includes determining and/or identifying the coordinates of each extracted rack/shelf. For this task, the labelled images are utilized (as described, for example, in connection with FIG. 2). By way merely of example, assume a shelf has four racks. To determine the coordinates of rack-1, a mask with rack-1 filled labelled images and a mask with empty rack images for rack-2, rack-3 and rack-4 are utilized. The resulting image provides a region of interest (ROI) associated with rack-1. Additionally, contour detection is carried out on the resulting image, and based at least in part on that contour detection, coordinates of rack-1 are determined. It is to be appreciated that this particular pseudocode shows just one example implementation of a process for determining coordinates of extracted manufacturing resources, and alternative implementations of the process can be used in other embodiments.

Figure 5:
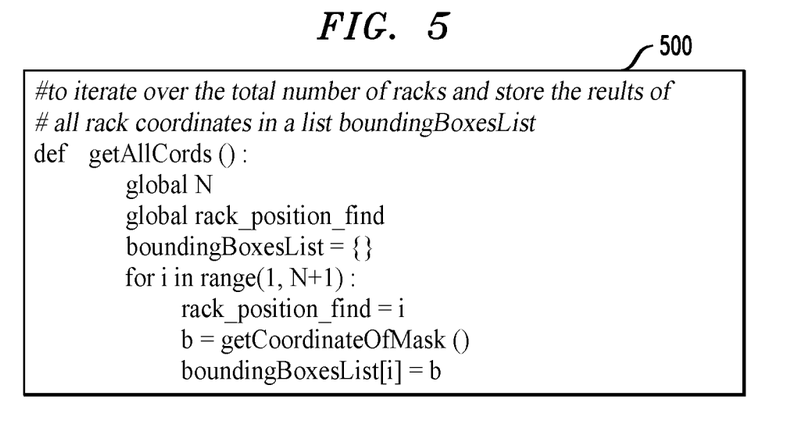
FIG. 5 shows example pseudocode for extracting an area of interest from identified coordinates in an image in an illustrative embodiment.

FIG. 5 shows example pseudocode for extracting an area of interest from identified coordinates in an image in an illustrative embodiment. In such an embodiment, pseudocode 500 is executed by or under the control of a processing platform, such as processing platform 103, or another type of processing platform. For example, the pseudocode 500 may be viewed as comprising a portion of a software implementation of at least part of manufacturing resource status determination component 105 of the FIG. 1 embodiment.

The pseudocode 500 illustrates example steps for extracting the ROI from identified coordinates. A ROI, as used in this context, includes a subset of an image or a dataset identified for a particular purpose. Specifically, for the purpose of generating one or more resource status-related predictions, at least one example embodiment includes extracting individual racks from a shelf using the coordinates determined, for example, via pseudocode 400. As detailed in pseudocode 500, such an embodiment can include using a crop function with one or more bounding box parameters. After determining the ROI associated with one or more individual racks, such information is provided as input to a CNN model for training and/or implementation (as detailed, for example, in connection with FIG. 6 below). It is to be appreciated that this particular pseudocode shows just one example implementation of a process for extracting an area of interest from identified coordinates in an image, and alternative implementations of the process can be used in other embodiments.

Figure 6:
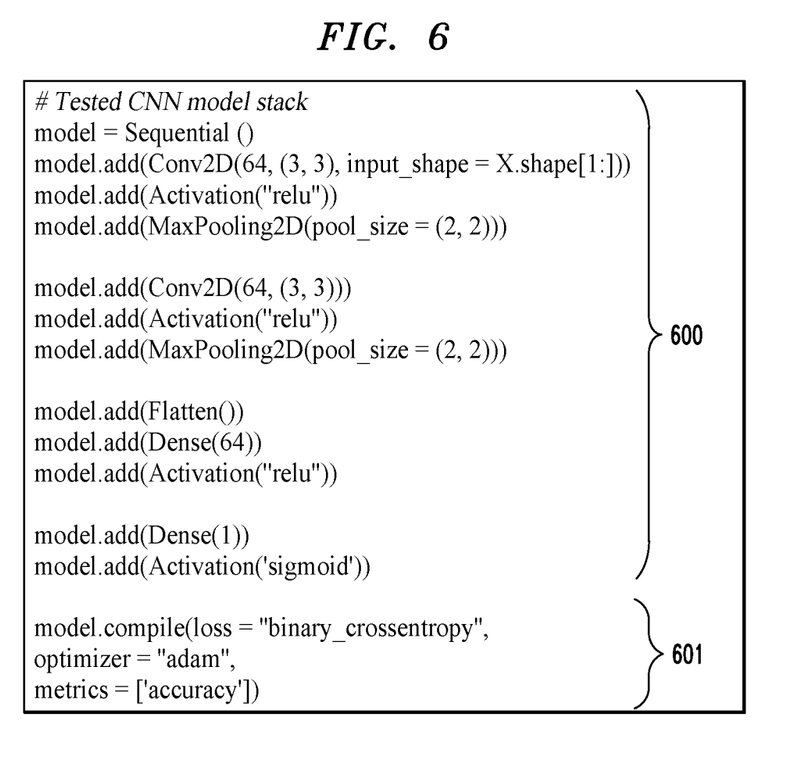
FIG. 6 shows example pseudocode for applying a convolutional neural network (CNN) model on an extracted area of interest to determine manufacturing resource availability and performing a CNN model evaluation in an illustrative embodiment.

FIG. 6 shows example pseudocode 600 for applying a CNN model on an extracted area of interest to determine manufacturing resource availability and example pseudocode 601 for performing a CNN model evaluation in an illustrative embodiment. In such an embodiment, pseudocode 600 and 601 are executed by or under the control of a processing platform, such as processing platform 103, or another type of processing platform. For example, the pseudocode 600 and 601 may be viewed as comprising a portion of a software implementation of at least part of manufacturing resource status determination component 105 of the FIG. 1 embodiment.

The pseudocode 600 illustrates example steps for applying a CNN model to data pertaining to a determined ROI to predict whether the corresponding rack/shelf is empty or not. As referred to herein, a CNN is a specific type of artificial neural network that uses at least one machine learning unit algorithm for supervised learning to analyze data. In one or more embodiments, the CNN can be configured dynamically by a user. Additionally, in such an embodiment, the CNN is a combination of convolutional, dense, pooling and optimizing layers, and further includes a sigmoid layer for binary classification. The CNN can also be modified (by the user) by adding and/or deleting one or more intermediate layers to fit at least one user and/or enterprise need.

The pseudocode 601 illustrates example steps for evaluating the CNN model. Specifically, once the model is trained, two graphs (one for accuracy and one for loss) can be generated. The user can evaluate the loss and accuracy values, and retrain the model with one or more changes by adding and/or removing layers to and/or from the model until the user is satisfied.

It is to be appreciated that this particular pseudocode shows just one example implementation of a process for utilizing and evaluating a CNN model, and alternative implementations of the process can be used in other embodiments.

Accordingly, as detailed herein, at least one embodiment includes determining manufacturing resource (e.g., rack) coordinates by reading an image as a gray scale, resizing the images, applying a median blur filter to the resized image, applying one or more other image processing noise reduction methods (if necessary and/or desired by a user), applying a canny edge detection method to the filtered image, and determining the contours and coordinates of the resulting image. In such an embodiment, using a canny edge detection method enables removal of noise in an image, and facilitates detection of the edges in a noisy state by applying a thresholding method.

As also detailed herein, such an embodiment can additionally include implementing a CNN model to determine and/or predict whether the manufacturing resource (e.g., rack) is empty, full, or partially full. In such an embodiment, an image is passed through a series of convolutional, nonlinear, pooling and fully connected layers of the CNN model, which then generates an output including a prediction of whether the manufacturing resource in the input image is empty, full, or partially full. In at least one embodiment, for example, the CNN model includes eleven layers: two convolutional layers, four activation layers, two pooling layers, two dense layers, and a sigmoid layer.

Figure 7:
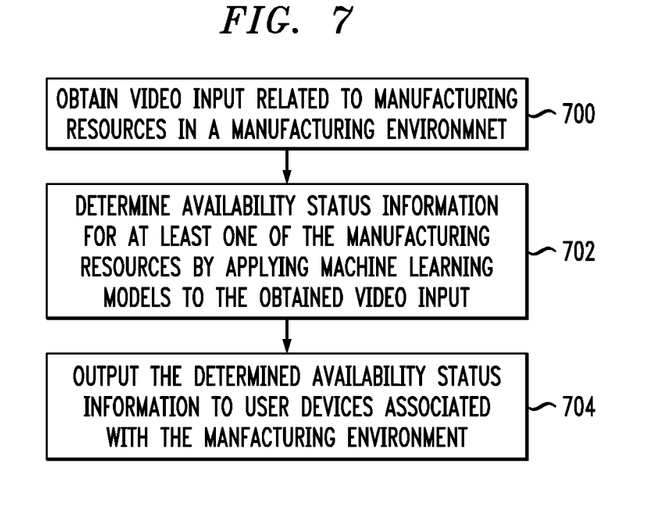
FIG. 7 is a flow diagram of a process for device manufacturing cycle time reduction using machine learning techniques in an illustrative embodiment.

FIG. 7 is a flow diagram of a process for device manufacturing cycle time reduction using machine learning techniques in an illustrative embodiment. It is to be understood that this particular process is only an example, and additional or alternative processes can be carried out in other embodiments.

In this embodiment, the process includes steps 700 through 704. These steps are assumed to be performed by the processor platform 103.

Step 700 includes obtaining video input related to one or more manufacturing resources in a manufacturing environment.

Step 702 includes determining availability status information for at least one of the one or more manufacturing resources by applying one or more machine learning models to the obtained video input. In at least one embodiment, the one or more machine learning models include one or more convolutional neural network models. Also, in such an embodiment, applying the one or more convolutional neural network models to the obtained video input includes passing the obtained video input through a series of one or more convolutional, nonlinear, pooling layers and one or more fully connected layers.

Also, in at least one embodiment, determining the availability status information includes converting the video input to one or more image frames. In such an embodiment, determining the availability status information also includes identifying at least one area of interest in the one or more image frames, and determining coordinates of the at least one manufacturing resource in the at least identified area of interest. Further, in such an embodiment, determining the coordinates of the at least one manufacturing resource in the at least identified area of interest includes reading the one or more image frames in gray scale, resizing the one or more image frames read in gray scale, applying a blur filter to the one or more resized image frames, applying at least one edge detection technique to the one or more filtered image frames, and determining the coordinates of the at least one manufacturing resource in the at least identified area of interest based at least in part on the application of the at least one edge detection technique to the one or more filtered image frames.

Additionally, in such an embodiment, determining the availability status information also includes extracting the at least one area of interest, in accordance with the determined coordinates, from the one or more image frames, as well as applying the one or more machine learning models to the at least one extracted area of interest.

Step 704 includes outputting the determined availability status information to at least one user device associated with the manufacturing environment. In at least one embodiment, outputting the determined availability status information includes displaying the determined availability status information on at least one mobile device associated with at least one user within the manufacturing environment.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement device management techniques using machine learning algorithms. These and other embodiments can facilitate increasing production capacity at manufacturing facilities.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of information processing system 100, these platforms may also be used to implement at least portions of other information processing systems in other embodiments.

Figure 8:
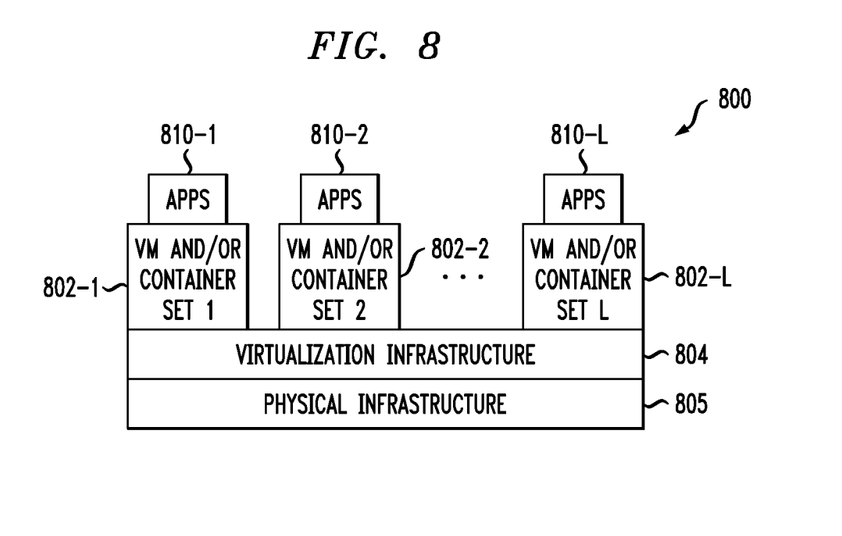
FIGS. 8 and 9 show examples of processing platforms that may be utilized to implement at least a portion of an information processing system in illustrative embodiments.
Figure 9:
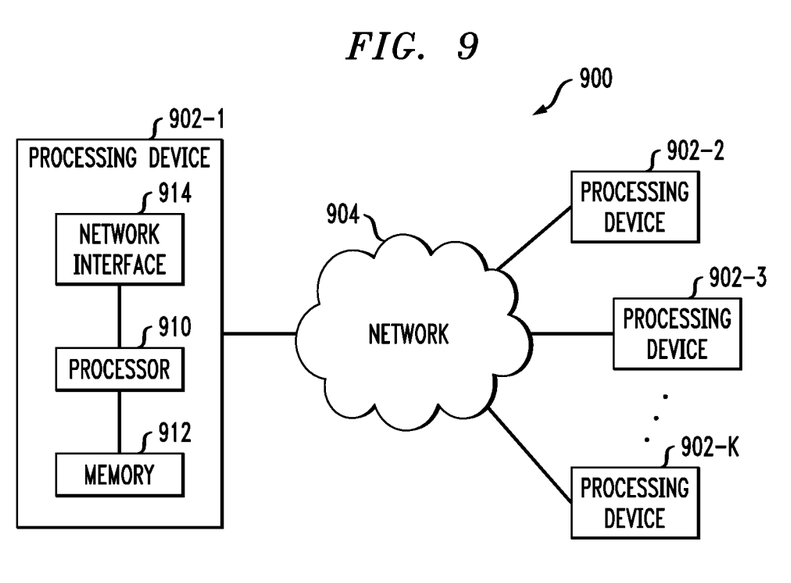

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of information processing system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a microcontroller, an application-specific integrated circuit (ASIC), a field-programmable gate array (FPGA) or other type of processing circuitry, as well as portions or combinations of such circuitry elements.

The memory 912 comprises random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, and devices in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining video input related to one or more manufacturing resources in a manufacturing environment, wherein the one or more manufacturing resources comprise one or more racks in the manufacturing environment;
determining availability status information for at least one of the one or more manufacturing resources by applying one or more machine learning models to the obtained video input, wherein the one or more machine learning models comprise one or more convolutional neural network models, wherein applying the one or more convolutional neural network models to the obtained video input comprises passing at least a portion of the obtained video input through a series of two or more convolutional, four or more nonlinear activation layers, two or more pooling layers, two or more fully connected layers, and at least one sigmoid layer for binary classification, and wherein determining the availability status information comprises:
converting the video input to one or more image frames;
identifying at least one area of interest in the one or more image frames; and
determining coordinates of the at least one manufacturing resource in the at least identified area of interest, wherein determining the coordinates comprises:
reading at least a portion of the one or more image frames in gray scale;
resizing the at least a portion of the one or more image frames read in gray scale;
applying a blur filter to the resized image frames;
applying at least one edge detection technique to the blur filtered image frames; and
determining the coordinates of the at least one manufacturing resource in the at least identified area of interest based at least in part on the application of the at least one edge detection technique to the blur filtered image frames; and
outputting the determined availability status information to at least one user device associated with the manufacturing environment;
wherein the method is performed by at least one processing device comprising a processor coupled to a memory.

2. The computer-implemented method of claim 1, wherein determining the availability status information comprises extracting the at least one area of interest, in accordance with the determined coordinates, from the one or more image frames.

3. The computer-implemented method of claim 2, wherein determining the availability status information comprises applying the one or more machine learning models to the at least one extracted area of interest.

4. The computer-implemented method of claim 2, wherein extracting the at least one area of interest comprises cropping at least one of the one or more racks from the at least one extracted area of interest using a graphical user interface.

5. The computer-implemented method of claim 1, wherein outputting the determined availability status information comprises displaying the determined availability status information on at least one mobile device associated with at least one user within the manufacturing environment.

6. The computer-implemented method of claim 1, wherein determining the availability status information for at least one of the one or more manufacturing resources comprises identifying each of the one or more racks in the manufacturing environment as one of empty, full, and partially full.

7. The computer-implemented method of claim 1, further comprising:
labelling at least a portion of the one or more image frames.

8. The computer-implemented method of claim 1, further comprising:
training the one or more convolutional neural network models based at least in part on one or more loss values and one or more accuracy values.

9. A non-transitory processor-readable storage medium having stored therein program code of one or more software programs, wherein the program code when executed by at least one processing device causes the at least one processing device:
to obtain video input related to one or more manufacturing resources in a manufacturing environment, wherein the one or more manufacturing resources comprise one or more racks in the manufacturing environment;

to determine availability status information for at least one of the one or more manufacturing resources by applying one or more machine learning models to the obtained video input, wherein the one or more machine learning models comprise one or more convolutional neural network models, wherein applying the one or more convolutional neural network models to the obtained video input comprises passing at least a portion of the obtained video input through a series of two or more convolutional, four or more nonlinear activation layers, two or more pooling layers, two or more fully connected layers, and at least one sigmoid layer for binary classification, and wherein determining the availability status information comprises:

converting the video input to one or more image frames;

identifying at least one area of interest in the one or more image frames; and determining coordinates of the at least one manufacturing resource in the at least identified area of interest, wherein determining the coordinates comprises:

reading at least a portion of the one or more image frames in gray scale;

resizing the at least a portion of the one or more image frames read in gray scale;

applying a blur filter to the resized image frames;

applying at least one edge detection technique to the blur filtered image frames; and determining the coordinates of the at least one manufacturing resource in the at least identified area of interest based at least in part on the application of the at least one edge detection technique to the blur filtered image frames; and to output the determined availability status information to at least one user device associated with the manufacturing environment.

10. The non-transitory processor-readable storage medium of claim 9, wherein determining the availability status information comprises extracting the at least one area of interest, in accordance with the determined coordinates, from the one or more image frames.

11. The non-transitory processor-readable storage medium of claim 10, wherein determining the availability status information comprises applying the one or more machine learning models to the at least one extracted area of interest.

12. The non-transitory processor-readable storage medium of claim 9, wherein outputting the determined availability status information comprises displaying the determined availability status information on at least one mobile device associated with at least one user within the manufacturing environment.

13. The non-transitory processor-readable storage medium of claim 9, wherein determining the availability status information for at least one of the one or more manufacturing resources comprises identifying each of the one or more racks in the manufacturing environment as one of empty, full, and partially full.

14. The non-transitory processor-readable storage medium of claim 9, wherein the program code when executed by the at least one processing device further causes the at least one processing device:

to label at least a portion of the one or more image frames.

15. An apparatus comprising:

at least one processing device comprising a processor coupled to a memory;

the at least one processing device being configured:

to obtain video input related to one or more manufacturing resources in a manufacturing environment, wherein the one or more manufacturing resources comprise one or more racks in the manufacturing environment;

to determine availability status information for at least one of the one or more manufacturing resources by applying one or more machine learning models to the obtained video input, wherein the one or more machine learning models comprise one or more convolutional neural network models, wherein applying the one or more convolutional neural network models to the obtained video input comprises passing at least a portion of the obtained video input through a series of two or more convolutional, four or more nonlinear activation layers, two or more pooling layers, two or more fully connected layers, and at least one sigmoid layer for binary classification, and wherein determining the availability status information comprises:

converting the video input to one or more image frames;

identifying at least one area of interest in the one or more image frames; and determining coordinates of the at least one manufacturing resource in the at least identified area of interest, wherein determining the coordinates comprises:

reading at least a portion of the one or more image frames in gray scale;

resizing the at least a portion of the one or more image frames read in gray scale;

applying a blur filter to the resized image frames;

applying at least one edge detection technique to the blur filtered image frames; and determining the coordinates of the at least one manufacturing resource in the at least identified area of interest based at least in part on the application of the at least one edge detection technique to the blur filtered image frames; and to output the determined availability status information to at least one user device associated with the manufacturing environment.

16. The apparatus of claim 15, wherein determining the availability status information comprises extracting the at least one area of interest, in accordance with the determined coordinates, from the one or more image frames.

17. The apparatus of claim 16, wherein determining the availability status information comprises applying the one or more machine learning models to the at least one extracted area of interest.

18. The apparatus of claim 15, wherein outputting the determined availability status information comprises displaying the determined availability status information on at least one mobile device associated with at least one user within the manufacturing environment.

19. The apparatus of claim 15, wherein determining the availability status information for at least one of the one or more manufacturing resources comprises identifying each of the one or more racks in the manufacturing environment as one of empty, full, and partially full.

20. The apparatus of claim 15, wherein the at least one processing device is further configured:
    to label at least a portion of the one or more image frames.

\* \* \* \* \*

UNITED STATES PATENT AND TRADEMARK OFFICE
CERTIFICATE OF CORRECTION

PATENT NO. : 11,216,911 B2
APPLICATION NO. : 16/669667
DATED : January 4, 2022
INVENTOR(S) : Hung T. Dinh et al.

It is certified that error appears in the above-identified patent and that said Letters Patent is hereby corrected as shown below:

In the Claims

In Claim 1, Column 11, Lines 61-63, please replace "passing at least a portion of the obtained video input through a series of two or more convolutional," with -- passing at least a portion of the obtained video input through a series of two or more convolutional layers, --.

In Claim 1, Column 12, Lines 5-7, please replace "determining coordinates of the at least one manufacturing resource in the at least identified area of interest" with -- determining coordinates of the at least one manufacturing resource in the at least one identified area of interest --.

In Claim 1, Column 12, Lines 16-18, please replace "determining the coordinates of the at least one manufacturing resource in the at least identified area of interest" with -- determining the coordinates of the at least one manufacturing resource in the at least one identified area of interest --.

In Claim 9, Column 13, Lines 10-12, please replace "passing at least a portion of the obtained video input through a series of two or more convolutional," with -- passing at least a portion of the obtained video input through a series of two or more convolutional layers, --.

In Claim 9, Column 13, Lines 22-24, please replace "determining coordinates of the at least one manufacturing resource in the at least identified area of interest" with -- determining coordinates of the at least one manufacturing resource in the at least one identified area of interest --.

In Claim 9, Column 13, Lines 33-35, please replace "determining the coordinates of the at least one manufacturing resource in the at least identified area of interest" with -- determining the coordinates of the at least one manufacturing resource in the at least one identified area of interest --.

In Claim 15, Column 14, Lines 19-20, please replace "passing at least a portion of the obtained video input through a series of two or more convolutional," with -- passing at least a portion of the obtained video input through a series of two or more convolutional layers, --.

Signed and Sealed this
Twenty-fifth Day of July, 2023

Katherine Kelly Vidal
*Director of the United States Patent and Trademark Office*

CERTIFICATE OF CORRECTION (continued)
U.S. Pat. No. 11,216,911 B2

In Claim 15, Column 14, Lines 30-32, please replace "determining coordinates of the at least one manufacturing resource in the at least identified area of interest" with -- determining coordinates of the at least one manufacturing resource in the at least one identified area of interest --.

In Claim 15, Column 14, Lines 42-44, please replace "determining the coordinates of the at least one manufacturing resource in the at least identified area of interest" with -- determining the coordinates of the at least one manufacturing resource in the at least one identified area of interest --.